United States Patent [19]

Iadanza

[11] Patent Number: 5,719,889
[45] Date of Patent: Feb. 17, 1998

[54] PROGRAMMABLE PARITY CHECKING AND COMPARISON CIRCUIT

[75] Inventor: Joseph Andrew Iadanza, Hinesburg, Vt.

[73] Assignee: International Business Machines Corporation, Armonk, N.Y.

[21] Appl. No.: 575,314

[22] Filed: Dec. 20, 1995

[51] Int. Cl.$^6$ .................................................. G06F 11/00
[52] U.S. Cl. ................ 371/49.3; 371/67.1; 395/182.04; 395/185.05
[58] Field of Search ................... 371/49.2, 49.1, 371/49.3, 49.4, 67.1, 68.1; 395/185.05, 182.04, 185.01, 182.03; 364/266.3, 266.4, 265.3, 945.6

[56] References Cited

U.S. PATENT DOCUMENTS

| | | | |
|---|---|---|---|
| 4,271,521 | 6/1981 | Mahmood | 371/51 |
| 4,580,265 | 4/1986 | Gooding et al. | 371/49 |
| 4,675,849 | 6/1987 | Kinoshita | 365/230 |
| 4,774,712 | 9/1988 | Lewis | 371/51 |
| 5,055,712 | 10/1991 | Hawley et al. | 307/465 |
| 5,088,092 | 2/1992 | Jeppesen, III et al. | 371/49.3 |
| 5,291,445 | 3/1994 | Miyaoka et al. | 365/189.08 |
| 5,384,738 | 1/1995 | Miyaoka et al. | 365/189.08 |
| 5,402,430 | 3/1995 | Asai et al. | 371/49.1 |
| 5,406,519 | 4/1995 | Ha | 365/195 |
| 5,408,434 | 4/1995 | Stansfield | 365/189.08 |
| 5,414,377 | 5/1995 | Freidin | 326/41 |

OTHER PUBLICATIONS

S. J.Hong, et al., "Array Logic Implementation of Decoder Check", IBM Technical Disclosure Bulletin, vol. 14, No. 8, Jan. 1972, p. 2362.

J. W. Jones, "Shared Macros and Facilities In Programmable Logic Arrays", IBM Technical Disclosure Bulletin, vol. 18, No. 3, Aug. 1975, pp. 823–825.

Primary Examiner—Robert W. Beausoliel, Jr.
Assistant Examiner—Trinh L. Tu
Attorney, Agent, or Firm—Susan M. Murray; Heslin & Rothenberg, P.C.

[57] ABSTRACT

A programmable parity circuit for a memory array includes at least one programmably selectable set of inputs arranged such that the circuit can be programmably configured to perform odd or even parity operations for data stored or to be stored in the memory array or to alternatively perform non-parity bit-wise comparisons for circuits outside the memory array. Provision is made for a variety of routing configurations.

19 Claims, 3 Drawing Sheets

PROGRAMMABLE PARITY CHECKING AND COMPARISON CIRCUIT

RELATED APPLICATION INFORMATION

This application relates to commonly owned concurrently filed U.S. patent applications:

1. Ser. No. 08/595,312, Docket No. FI995-077, entitled "Field Programmable Memory Array";
2. Ser. No. 08/595,422, Docket No. FI995-140, entitled "A System for Implementing Write, Initialization and Reset In a Memory Array Using a Single Cell Write Port".

The section entitled "Description of the Preferred Embodiment(s)" and the drawings, from each of the above-referenced related U.S. Patent applications are hereby expressly incorporated by reference.

FIELD OF THE INVENTION

This invention relates in general to data memory and more specifically to a programmable memory array with associated programmable routing and control resources. More particularly, this invention relates to a programmable parity checking and comparison circuit for a programmable memory array.

BACKGROUND OF THE INVENTION

Related application, Ser. No. 08/595,312, Docket No. FI995-077, entitled "Field Programmable Memory Array", proposes a programmable memory array. The proposed programmable memory array has associated with it programmable routing and control resources in order to implement selectively configurable data storage architectures (e.g. having varying widths and/or depths) and data access techniques (e.g. simple read/write, Last In First Out (LIFO), First In First Out (FIFO) or rollover data stack operations).

Parity is a term associated with data integrity checking operations. Circuitry for performing data integrity checking based on parity is commonly included in both memory and logic circuits. Common parity operations include parity generation and parity checking. Parity generation refers to the calculation of a parity bit which may be associated with a group of binary digits for later reference. The parity bit is calculated so as to make the sum of all the digits (including the parity bit) either odd or even, depending on the storage architecture. A parity check is the operation of comparing a previously determined parity bit with a recalculated parity bit. For example, a parity bit first generated prior to writing data to memory may be compared against a recalculated parity bit upon later reading the same word from memory, as a means of insuring that the data was not corrupted during storage in memory or during transmission to and from memory. Data corruption may be caused by signal noise, power supply noise or radiation, such as alpha particle radiation or cosmic radiation.

Conventional parity circuits are tailored for and dedicated to the data storage architecture of the memory circuit they service. For example, the data storage architecture normally defines whether parity is to be odd or even. Therefore, conventional parity circuits are characterized either as odd parity or as even parity. By way of further example, the inputs and outputs of conventional parity circuits are fixed since the flow of data into and out of the parity circuit depends on the predetermined data storage architecture; routing flexibility is not provided. Furthermore, conventional parity circuits are used only for parity operations and do not provide other non-parity logical functions in support of circuits external to the memory.

For a programmable memory array having a selectively configurable data storage architecture, it would be desirable to have a selectively configurable parity checking circuit, such that a variety of parity operations and parity I/O routing alternatives can be flexibly programmed along with the data storage architecture.

The related programmable memory array application referred to above also proposes incorporating together into an integrated circuit a field programmable gate array (FPGA) and a programmable memory array. An FPGA is an array of distinct uncommitted logic cells having a field programmable interconnect network for interconnecting the cells and/or for providing data input to and output from the array. The logic cells of an FPGA can be configured to provide a comparison function. However, such a use of logic cells for multibit comparisons is a relatively inefficient use of the logic cells. Therefore, in an integrated circuit combining an FPGA with a programmable memory array, it would be desirable to have a programmable parity checking and comparison circuit implemented in the programmable memory array and programmably configurable to alternatively provide parity functions or non-parity compare functions, and further configurable to flexibly route parity data within the memory array and non-parity comparison data between the memory array and the FPGA.

SUMMARY OF THE INVENTION

It is an object of the present invention to provide a programmable parity checking and comparison circuit which is selectively configurable.

It is an object of the present invention to provide a programmable parity checking and comparison circuit for a programmable memory array.

It is a further object still of the present invention to provide a programmable parity checking and comparison circuit for an integrated circuit combining a programmable memory array and an FPGA, the parity checking circuit providing parity functions to the programmable memory array and non-parity compare functions to the FPGA.

The present invention is directed to a programmable parity checking and comparison circuit. The programmable parity checking and comparison circuit includes a first set of inputs, a second set of inputs programmably selectable from third and fourth sets of inputs, and a circuit for selectively providing a parity bit based on the first and third sets of inputs or a comparison bit based on the first and fourth sets of inputs. In one aspect of the invention the parity type can be configured as odd or even.

In another aspect of the invention the programmable parity checking and comparison circuit is incorporated in a memory array having a plurality of memory blocks, a primary I/O bus for carrying data to and from the memory array, and a secondary I/O bus for carrying data between memory blocks within the array and includes a parity input routing circuit, a parity/compare circuit, and a parity output routing circuit.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of the preferred embodiments and the accompanying drawings in which:

DETAILED DESCRIPTION OF THE PREFERRED EMBODIMENT

Figure 1:
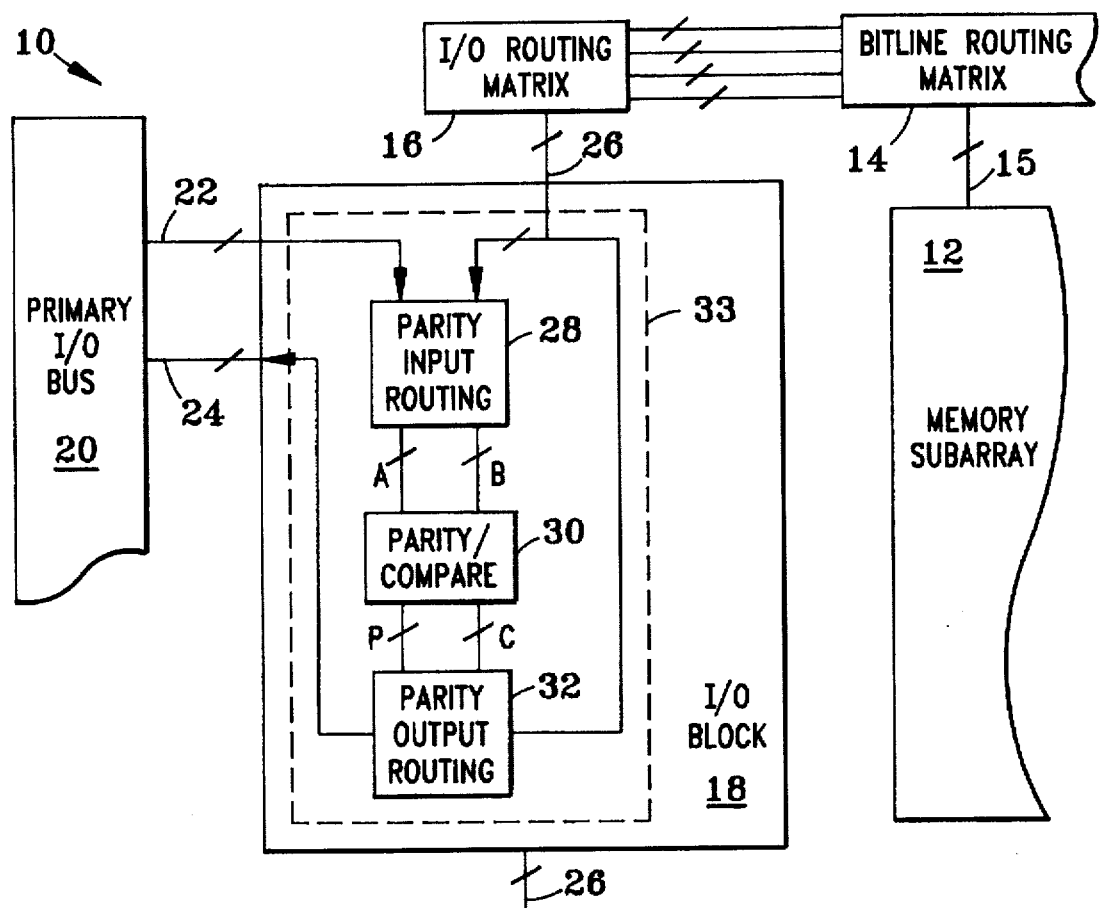
FIG. 1 is block diagram of a portion of an exemplary programmable memory array including the programmable parity checking circuit of the present invention.

FIG. 1 is block diagram of a portion of an exemplary programmable memory array 10, as described in related application Ser. No. 08/595,312, Docket No. FI995-077, entitled "Field Programmable Memory Array", further incorporating the present invention. The programmable memory array 10 is described in detail in the related application, previously incorporated by reference, and will be described here only to the extent necessary to explain the relationship of the present invention to the programmable memory array 10.

With reference to FIG. 1, a memory subarray 12 comprises a plurality of memory cells arranged in an array of M rows and N columns. Memory subarray 12 provides M storage words with each word being N bits wide. Although, for purposes of clarity, FIG. 1 shows only one memory subarray 12, it should be understood that the programmable memory array 10 includes a plurality of like memory subarrays 12 selectively programmed for implementing a variety of different memory configurations and operating modes.

Data is propagated to and from the memory subarray 12 by means of the primary I/O bus 20, associated intercoupling lines 22 and 24, I/O block 18, secondary I/O bus 26, I/O routing matrix 16 and bitline routing matrix 14. The primary I/O bus 20 provides connectivity between the programmable memory array 10 and circuits outside (not shown) the programmable memory array 10, for example, an FPGA incorporated together with the programmable memory array on an integrated circuit. An I/O block 18 provides selective connectivity between the primary I/O bus 20 and the secondary I/O bus 26. I/O routing matrix 16 associated with memory subarray 12 provides selective connectivity between secondary I/O bus 26 and bitline routing matrix 14. Bitline routing matrix 14 controls immediate access to the memory subarray 12 by providing selective connectivity to various functional bitlines 15 (only 1 shown) associated with the array, for example, a read bit line, write bit line and the like. The bit lines 15 are placed into a programmable hierarchical arrangement which may include local bit lines, semi-global bit lines and global bit lines. Further detail of the various elements of the programmable memory is set out in the referenced programmable memory applications.

The programmable parity checking and comparison circuit 33 of the present invention may be incorporated in the I/O block 18 of the programmable memory array 10 as depicted in FIG. 1. The programmable parity checking and comparison circuit 33 includes a parity input routing circuit 28, a parity/compare circuit 30, and a parity output routing circuit 32. The parity input routing circuit 28 may selectively couple the primary data bus 20 via intercoupling line 22, the secondary data bus 26 or other resources (not shown) to inputs (e.g. inputs A and B) of parity/compare circuit 30.

Parity/compare circuit 30 is programmable to selectively provide outputs P and C representative of a variety of parity (P) and/or comparison (C) functions, which will be described in further detail below. Parity output routing circuit 32 provides selective connectivity between the outputs P and C to the primary I/O bus 20 via intercoupling line 24 and/or the secondary I/O bus 26.

Various technologies are known to those skilled in the art for providing array programmability. The preferred approach for programming programmable resources of the present invention involves SRAM memory cells, programmed by a user, although other programming structures such as fuses, antifuses and so forth could also be implemented. The programmable parity checking circuit of the present invention is configured in accordance with techniques similar to those for configuring a field programmable gate array, as disclosed in the publication entitled "APPLICATION NOTE AT6000 SERIES CONFIGURATION", May 1993, Revision 1B, Atmel Corporation, which is hereby incorporated by reference in its entirety.

Figure 2A:
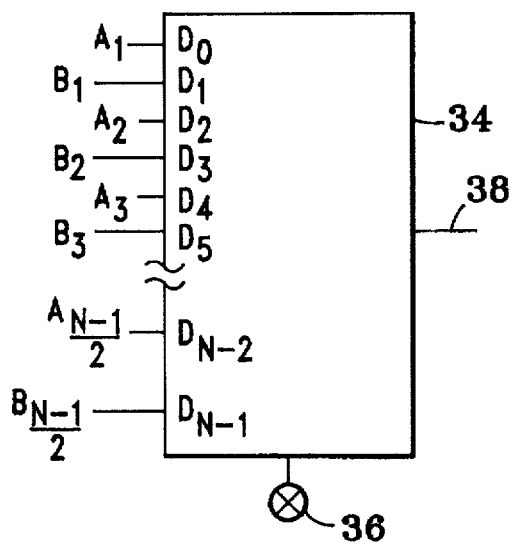
FIG. 2A is a block diagram of an exemplary programmable parity/compare circuit of the present invention.
Figure 2B:
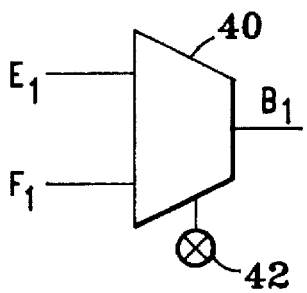
FIG. 2B is schematic diagram of a primary input multiplexer of the present invention.

With reference to FIG. 2A there is shown a programmable comparing circuit 34 which may be included in the programmable parity checking and comparison circuit 33 above identified with respect to FIG. 1. The programmable comparing circuit 34 has a plurality of input nodes, $D_0-D_{N-1}$, where N is the width of memory subarray 12 and where the Nth bit comprises a parity bit when parity checking is used. The input nodes $D_0-D_{N-1}$ may be connected to a plurality of input groups, shown in FIG. 2A as two groups identified as $A_1-A_{(N-1)/2}$, hereinafter collectively referred to as the A input group, and $B_1-B_{(N-1)/2}$, hereinafter collectively referred to as the B input group. At least one of the input groups is programmably selectable. In FIG. 2A, the B inputs are programmably selectable as is shown for one of the B inputs in further detail in FIG. 2B. With reference to FIG. 2B, the $B_1$ input is programmably selected from a plurality of inputs $E_1$ and $F_1$ by primary input multiplexer 40 in accordance with configuration information stored in primary input multiplexer configuration bit 42.

Programmably selectable inputs B can be configured so as to enable programmable comparing circuit 34 to be used for alternative functions. For example, in a first configuration, a single N-1 bit word can be provided at the input nodes $D_0-D_{N-1}$ for generating at output 38 a parity bit. It may be convenient to provide the even bits of the N-1 bit word to one group of inputs (e.g. the A inputs) and the odd bits of the N-1 bit word to another group of inputs (e.g. the B inputs), but for purposes of parity checking input ordering is not critical. Alternatively, in a second configuration, first and second (N-1)/2 bit words can be provided respectively on the A and B inputs for performing a bit-wise comparison (e.g. bit 1 of the first word is placed on input $A_1$ while bit 1 of the second word is placed on input $B_1$, and so forth) and generating a comparison signal at the output 38 indicating whether all the bits are the same or not.

Parity type configuration bit(s) 36 may be used to selectively configure the programmable comparing circuit 34 to provide odd or even parity when providing a parity bit. An odd parity bit, when added to all of the digits in the word, results in an odd sum; an even parity bit, when added to all of the digits in the word, results in an even sum. Alternatively, parity type configuration bit(s) 36 may be used to selectively configure programmable comparing circuit 34 to provide a comparison output function at output 38.

Figure 3:
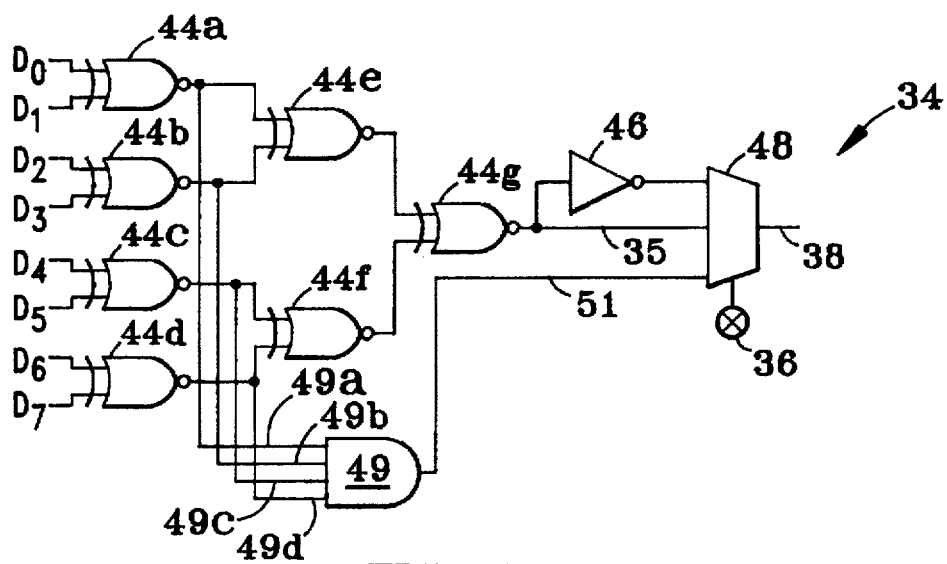
FIG. 3 is a schematic diagram of the exemplary programmable parity/compare circuit of FIG. 2A.

FIG. 3 shows an exemplary circuit schematic of comparing circuit 34 when N=9, which includes a conventional XNOR parity tree comprising XNOR logic gates 44a–44g and AND gate 49 having inputs 49a–49d sourced respectively by the first tier of XNOR gates (e.g. gates 44a–44d). In accordance with configuration information stored in parity type configuration bit(s) 36, parity type multiplexer 48 selectively provides at an output 38, one of even parity output 35, odd parity output 37, as provided by inverter 46, or compare output 51 as provided by AND gate 49.

Figure 4:
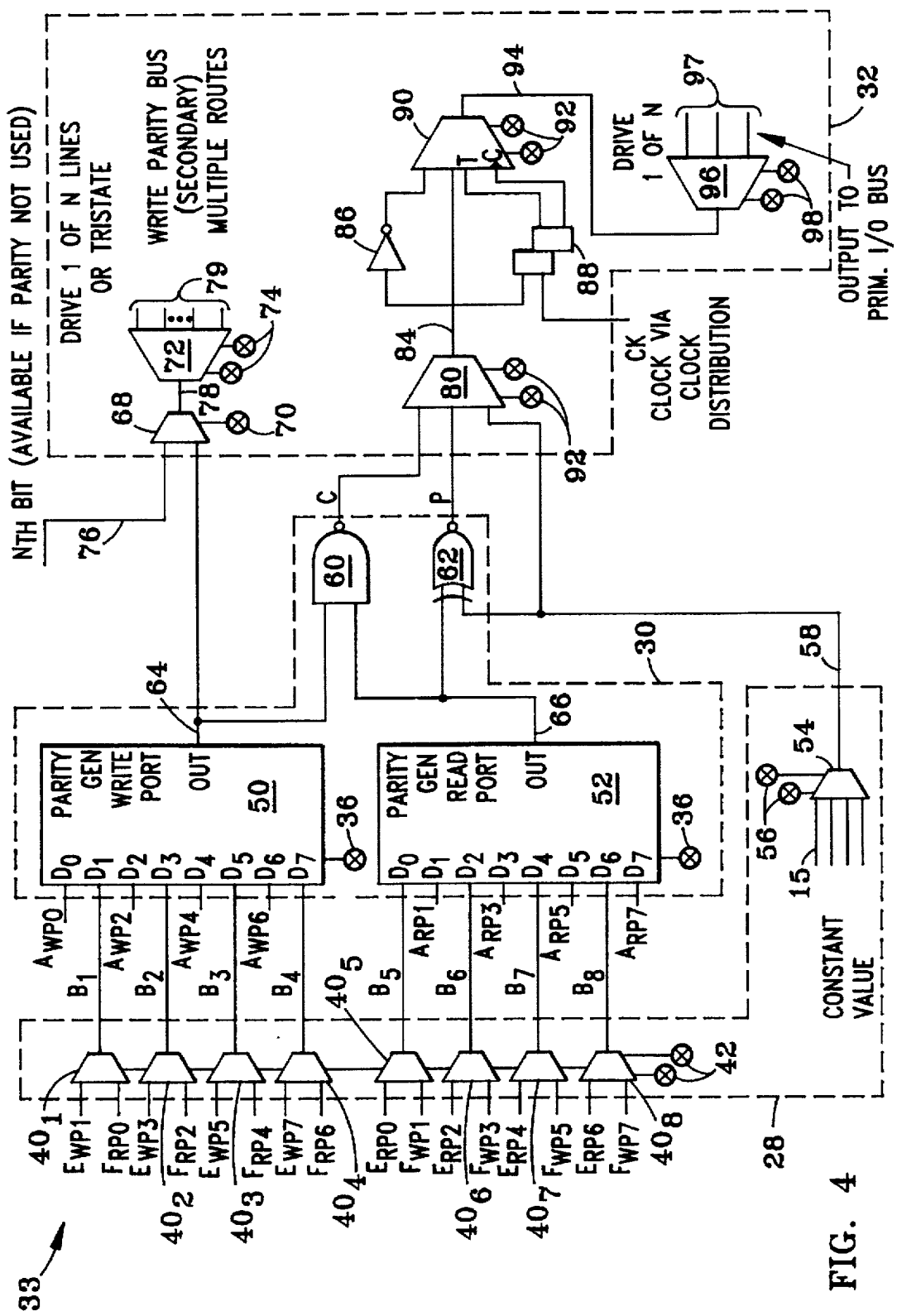
FIG. 4 is an exemplary schematic diagram of the programmable parity checking circuit shown in FIG. 1.

FIG. 4 is a detailed schematic diagram of an exemplary programmable parity checking circuit 33 as shown in FIG. 1. For the sake of simplicity and clarity, FIG. 4 as drawn supports a memory subarray 12 configured as a RAM having a bit width of N=9, and using a single bit (e.g. the Nth bit) as a parity bit. However, in light of the disclosure contained herein, a person of ordinary skill in the art would observe that N and the number of parity bits can be adjusted as desired. A person of ordinary skill in the art would also observe that the disclosed programmable parity checking circuit 33 can support a memory subarray 12 storing words of width less than N, so long as the unused bits are fixed at a predetermined level (e.g. "tied off") as is conventional in memory design.

With reference to FIG. 4, parity input routing circuit 28 may include a plurality of primary input multiplexers $40_1$–$40_8$. The number of primary input multiplexers 40 is preferably the word width N less the number of parity bits. As depicted in FIG. 4, where N=9 and 1 parity bit is used, the number of primary input multiplexers 40 is eight. Each of the multiplexers $40_1$–$40_8$ for selecting alternative inputs in accordance with primary input multiplexer configuration bit 42 operate similarly to the primary input multiplexer 40 of FIG. 2B. For example, in a first configuration, inputs $E_{WP1}$, $E_{WP3}$, $E_{WP5}$, $E_{WP7}$, $E_{RP0}$, $E_{RP2}$, $E_{RP4}$, $E_{RP6}$ (collectively referred to as the E inputs) may be selected. In an alternate second configuration, inputs $F_{RP0}$, $F_{RP2}$, $F_{RP4}$, $F_{RP6}$, $F_{WP1}$, $F_{WP3}$, $F_{WP5}$, $F_{WP7}$ (collectively referred to as the F inputs) may be selected. Additional configuration bits may be added to allow greater programmability of primary input multiplexers $40_1$–$40_8$. For example, it may be desirable to have additional inputs of constant value for providing a known reference for comparison. Further, it may be desirable to have separate configuration bits for each of the primary input multiplexers $40_1$–$40_8$ to allow independent control over each. It will be understood that such increased flexibility would be accompanied by increased required circuit space, which may not be desirable.

Parity input routing circuit 28 also may include secondary input multiplexer 54 which, in accordance with configuration information stored in configuration bits 56, may selectively provide at its output 58 one of the following: a known constant value for providing another basis of comparison, parity information via one or more of the hierarchically arranged bit lines 15 of a word previously stored in memory, or other desired alternate inputs.

Parity/compare circuit 30 may include programmable write parity and comparing circuit 50 and programmable read parity and comparing circuit 52. Programmable write parity and comparing circuit 50 may have a first set of fixed inputs $A_{WP0}$, $A_{WP2}$, $A_{WP4}$, $A_{WP6}$ connected respectively to even input nodes $D_0$, $D_2$, $D_4$, $D_6$ and generally designated for carrying write data, and a second set of programmably selective inputs $B_1$, $B_2$, $B_3$, and $B_4$ connected respectively to odd input nodes $D_1$, $D_3$, $D_5$, $D_7$, provided by respective primary input multiplexers $40_1$, $40_2$, $40_3$, $40_4$. The E inputs to primary input multiplexers $40_1$, $40_2$, $40_3$, $40_4$ are generally designated for carrying write data, while the F inputs to primary input multiplexers $40_1$, $40_2$, $40_3$, $40_4$ are generally designated for carrying read data.

Programmable read parity and comparing circuit 52 has a first set of inputs $A_{RP1}$, $A_{RP3}$, $A_{RP5}$, $A_{RP7}$ connected respectively to input nodes $D_1$, $D_3$, $D_5$, $D_7$ and generally designated for carrying read data, and a second set of programmably selective inputs $B_5$, $B_6$, $B_7$, and $B_8$ connected respectively to input nodes $D_0$, $D_2$, $D_4$, $D_6$, provided by respective primary input multiplexers $40_5$, $40_6$, $40_7$, $40_8$. The E inputs to primary input multiplexers $40_5$, $40_6$, $40_7$, $40_8$ are generally designated for carrying read data, while the F inputs to primary input multiplexers $40_5$, $40_6$, $40_7$, $40_8$ are generally designated for carrying write data.

Each of the programmable read parity and compare circuit 50 and the programmable write parity and compare circuit 52 operate similarly to the descriptions referring to FIGS. 2A and 3, which description will not be repeated here for the sake of brevity.

Comparison logic gate 60 receives at its inputs the outputs 64 and 66 respectively of the programmable write parity and comparing circuit 50 and the programmable read parity and comparing circuit 52 and provides an output C. Parity logic gate 62 receives at its inputs the output 66 of the programmable read parity and comparing circuit 52 and the output 58 of the secondary input multiplexer 54 and provides an output P.

Parity output routing circuit 32 selectively routes to other resources in the programmable memory array 10 various signals generated by the parity/compare circuit 30 and the parity input routing circuit 28. Write selector 68 selects, in accordance with the data stored in write selector configuration bit 70, the output 64 of the programmable write parity and compare circuit 50 or non-parity input 76 and provides the result at write selector output 78. Together, non-parity input 76 and write selector 68 provide write access to the Nth bit of the RAM when neither parity generation nor parity checking is required. Secondary write data bus port 72 drives the output 78 of write selector 68 onto 1 or more of a plurality of lines 79 of the secondary I/O bus 26 (see FIG. 1) in accordance with data stored in secondary write data bus port configuration bits 74, for writing into a memory subarray 12. The plurality of lines 79 of the secondary I/O bus 26 may represent a hierarchy of routing paths (e.g. bitlines 15) explicitly associated with the Nth bit of the memory subarray 12. Unselected outputs are configured so as to provide a high output impedance (e.g. using tristate buffers). If it is not desired to route either of the output 64 or non-parity input 74 to the secondary I/O bus 26, configuration bits 74 can also be programmed to deselect all outputs. Deselecting outputs in this manner, frees up the deselected lines of the secondary I/O bus 26 for use by other I/O blocks 18 of the programmable memory array 10.

With continued reference to FIG. 4, read selector 80 selects, in accordance with the data stored in read selector configuration bits 82, one of output C provided by comparison logic gate 60, output P provided by parity logic gate 62, and output 58 of secondary input multiplexer 54 and provides the result at read selector output 84. Output conditioning selector 90 receives read selector output 84 in an unconditioned form (84), as inverted by inverter 86, and as latched by latch 88, and in accordance with data stored in output conditioning selector configuration bits 92, places the result at conditioned output 94. Clock signal CK, which is distributed across the memory array as described in related application Ser. No. 08/595,312, IBM Docket No. FI995-077, is used to clock latch 88 and output conditioning selector 90, such that when the latched input is selected conditioned output 94 can be synchronized to the clock signal CK.

Primary read data bus port 96, similarly to secondary write data bus port 72, drives the conditioned output 94 onto 1 or more of a plurality of lines 97 of the primary I/O bus 20 (see FIG. 1) in accordance with data stored in primary read data bus port configuration bits 98 for carrying data read from a memory subarray 12 outside the programmable memory array. Unselected lines are configured so as to provide a high output impedance (e.g. using tristate buffers). If it is not desired to route the conditioned output 94 to the primary I/O bus 20, configuration bits 98 can be programmed to deselect all outputs 97. Deselecting outputs in this manner, frees up the deselected lines of the primary I/O bus 20 for use by other portions of the programmable memory array 10 or by other circuits accessing the programmable memory array (e.g. an FPGA).

By way of further explanation of FIGS. 1 and 4, several operational examples showing how the programmable parity checking circuit 33 can be programmably configured to perform alternative functions will now be described.

In a first operational example, the programmable parity checking and comparison circuit 33 is used to generate a parity bit for an N-bit data word to be written to one of the memory subarrays 12. A first set of bits of the N-bit data word (e.g. even bits) are provided from the primary I/O bus 20 at inputs $A_{WP0}$, $A_{WP2}$, $A_{WP4}$, $A_{WP6}$. Primary input multiplexers $40_1$, $40_2$, $40_3$, $40_4$ are programmed by primary input multiplexer configuration bit(s) 42 to select the remaining bits of the N-bit word (e.g. odd bits) at inputs and comparing circuit 50 receives the two sets of inputs and generates an odd or even parity bit, as programmed by parity type configuration bit 36, at output 64. Write selector 68, in accordance with write selector configuration bit 70 provides the parity bit to secondary write data bus port 72 which, as programmed by secondary write data bus port configuration bits 74, puts the parity bit on one or more of the plurality of lines 79 of the secondary I/O bus 26 to be written to a memory subarray 12. If programmable read parity and comparing circuit 52 is not simultaneously needed to calculate parity or make a comparison, read selector 80 may be programmed by configuration bits 82 to select secondary input multiplexer output 58 to be driven onto the primary I/O bus 20 through conditioning selector 90 and primary read data bus port 96. Alternatively, primary read data bus port 96 may be configured by configuration bits 98 to deselect all outputs as described above.

In a second operational example, the programmable parity checking and comparison circuit 33 is used to perform a bit-wise comparison of first and second N-1 bit words, not necessarily read from or written to a memory subarray 12 (e.g. non-parity comparison). A first N-1 bit data word is provided from the primary I/O bus 20 at inputs $A_{WP0}$, $A_{WP2}$, $A_{WP4}$, $A_{WP6}$ of programmable write parity and comparing circuit 50, and at inputs $F_{WP1}$, $F_{WP3}$, $F_{WP5}$, $F_{WP7}$ of programmable read parity and comparing circuit 52. Primary input multiplexers $40_1$, $40_2$, $40_3$, $40_4$, $40_5$, $40_6$, $40_7$, $40_8$ are programmed by primary input multiplexer configuration bit(s) 42 to select the respective bits of the second word also provided from the primary I/O bus 20 at respective inputs $F_{RP0}$, $F_{RP2}$, $F_{RP4}$, $F_{RP6}$, $A_{RP1}$, $A_{RP3}$, $A_{RP5}$, $A_{RP7}$. In an alternate embodiment, additional multiplexers similar to multiplexers 40, having at least one constant value input, may be provided at the A group of inputs of programmable write parity and comparing circuit 50 and programmable read parity and comparing circuit 52, so as the render the A group of inputs programmably selective. In this way, the constant value inputs of the multiplexers 40 (including the additional multiplexers) may be employed to implement a search or matching function. Outputs 64 and 66 respectively of the programmable write parity and compare circuit 50 and the programmable read parity and compare circuit 52 are then finally compared by comparison logic gate 60. Read selector 80 is programmed by read selector configuration bits 82 to select output C, which output is driven onto one or more of the plurality of lines 97 coupled to the primary I/O bus 20. Secondary write data bus port 72 is programmed by configuration bits 74 to deselect all outputs 79 as described above.

In a third operational example, the programmable parity checking circuit 33 is used to compare a previously stored parity bit with a newly generated parity bit of an N-1 bit word stored in a memory subarray 12. A first set of bits of the N-1 bit data word (e.g. odd bits) stored in memory subarray 12 are provided from the secondary I/O bus 26 at inputs $A_{RP1}$, $A_{RP3}$, $A_{RP5}$, $A_{RP7}$. Primary input multiplexers $40_5$, $40_6$, $40_7$, $40_8$ are programmed by primary input multiplexer configuration bit(s) 42 to select the remaining bits of the N-1 bit word (e.g. even bits) at inputs $E_{RP0}$, $E_{RP2}$, $E_{RP4}$, $E_{RP6}$. Secondary input multiplexer 54 is programmed by configuration bits 56 to select an input representing a previously calculated parity bit for the N-1 bit word. Output 66 of programmable read parity and comparing circuit 52 and output 58 of secondary input multiplexer are compared by parity logic gate 62 to provide output P. Read selector 80 is programmed by configuration bits 82 to select P to be driven onto one or more of the plurality of lines 97 coupled to the primary I/O bus 20. Secondary write data bus port 72 is programmed by configuration bits 74 to deselect all outputs 79 as described above.

The programmable parity checking and comparison circuit can be configured in many other ways to provide a variety of parity and/or comparison functions, including combinations of the above examples, and to accommodate a variety of routing patterns.

While the invention has been particularly shown and described with reference to preferred embodiments thereof, it will be understood by those skilled in the art that various other changes in form and detail may be made therein without departing from the spirit and scope of the invention.

We claim:

1. A programmable parity and comparison circuit comprising:

a first plurality of inputs;

a second plurality of inputs, the second plurality of inputs programmably selectable from a third plurality of inputs and a fourth plurality of inputs; and a first circuit coupled to the first and second plurality of inputs for generating a parity bit based on the first and third plurality of inputs, for generating a comparison bit by performing a bit-wise comparison of the first and fourth plurality of inputs, and programmably selectable for providing at an output one of the parity bit and the comparison bit.

2. The circuit as recited in claim 1 wherein the first circuit is configurable to provide an odd parity bit or an even parity bit.

3. The circuit as recited in claim 1 wherein the first plurality of inputs and third plurality of inputs represent complementary portions of a word to be written to a memory array.

4. The circuit as recited in claim 3 wherein the first plurality of inputs and third plurality of inputs represent alternating bits of the word to be written to the memory array.

5. The circuit as recited in claim 1 wherein the first plurality of inputs and third plurality of inputs represent complementary portions of a word read from a memory array.

6. The circuit as recited in claim 5 wherein the first plurality of inputs and third plurality of inputs represent alternating bits of the word read from the memory array.

7. In a memory array having a plurality of memory blocks, a primary I/O bus for carrying data to and from the memory array, and a secondary I/O bus for carrying data between memory blocks within the memory array, a programmable parity and comparison circuit comprising:

a parity input routing circuit comprising a first plurality of inputs and a second plurality of inputs, the second plurality of inputs programmably selectable from a third plurality of inputs and a fourth plurality of inputs, wherein the first and third plurality of inputs are connectable to the primary I/O bus and the fourth plurality of inputs are connectable to the secondary I/O bus;

a parity/compare circuit coupled to the first and second plurality of inputs for generating a first parity bit based on the first and third plurality of inputs, for generating a first comparison bit by performing a bit-wise comparison of the first and fourth plurality of inputs, and programmably selectable for providing at a first output one of the first parity bit and the first comparison bit; and a configurable parity output routing circuit coupled to the parity/compare circuit for selectively driving one of the parity bit or the first comparison bit onto one of the primary I/O bus and the secondary I/O bus.

8. The programmable parity and comparison circuit as recited in claim 7 wherein the parity input routing circuit further comprises an input selector for selectively coupling one of a plurality of auxiliary inputs to at least one of:

the parity/compare circuit for providing another basis of comparison, and the parity output routing circuit.

9. The programmable parity and comparison circuit as recited in claim 8 wherein the auxiliary inputs include a predetermined value.

10. The programmable parity and comparison circuit as recited in claim 8 wherein the auxiliary inputs include a second parity bit previously generated.

11. The programmable parity and comparison circuit as recited in claim 7 wherein:

the parity input routing circuit further comprises a fifth plurality of inputs and a sixth plurality of inputs, the sixth plurality of inputs programmably selectable from a seventh plurality of inputs and an eighth plurality of inputs, wherein the fifth and seventh plurality of inputs are connectable to the secondary I/O bus and the eighth plurality of inputs are connectable to the primary I/O bus;

the parity/compare circuit is further coupled to the fifth and sixth plurality of inputs for generating a second parity bit based on the fifth and seventh plurality of inputs, for generating a second comparison bit by performing a bit-wise comparison of the fifth and eighth plurality of inputs, and programmably selectable for providing at a second output one of the second parity bit and the second comparison bit.

12. The programmable parity and comparison circuit as recited in claim 11 wherein the first plurality of inputs and third plurality of inputs represent alternating bits of word to be written to the memory array and wherein the fifth plurality of inputs and the seventh plurality of inputs represent alternating bits of a word read from the memory array.

13. The programmable parity and comparison circuit as recited in claim 11 wherein the parity/compare circuit further comprises first logic means for comparing first and second comparison bits and for providing a word comparison output.

14. The programmable parity and comparison circuit as recited in claim 13 wherein the parity/compare circuit further comprises:

a secondary input selector for selectively coupling one of a plurality of auxiliary inputs to at least one:

the parity/compare circuit for providing another basis of comparison, and the parity output routing circuit, wherein the auxiliary inputs include a predetermined value; and second logic means for comparing one of the first output and the second output to the predetermined value.

15. The programmable parity and comparison circuit as recited in claim 14 wherein the parity output routing circuit comprises:

a first circuit for driving the first output onto the secondary I/O bus; and a second circuit for driving one of the word comparison output, the third output and a predetermined value onto the primary I/O bus.

16. The programmable parity and comparison circuit as recited in claim 15 wherein the second circuit comprises a signal conditioning means.

17. The programmable parity and comparison circuit are recited in claim 16 wherein the signal conditioning means receives an input signal and is configurable to provide at an output the input signal in an inverted, non-inverted, or latched form.

18. The programmable parity and comparison circuit as recited in claim 7 wherein the parity output routing circuit comprises:

a first circuit for driving the first output onto the secondary I/O bus.

19. The programmable parity and comparison circuit as recited in claim 7 wherein the first plurality of inputs and third plurality of inputs represent alternating bits of a word to be written to the memory array.

* * * * *